(12) United States Patent
Rabin

(10) Patent No.: US 8,225,520 B2
(45) Date of Patent: Jul. 24, 2012

(54) EXPANDABLE LEVELER

(76) Inventor: Jared Rabin, Irvine, CA (US)

( * ) Notice: Subject to any disclaimer, the term of this patent is extended or adjusted under 35 U.S.C. 154(b) by 0 days.

(21) Appl. No.: 13/178,176

(22) Filed: Jul. 7, 2011

(65) Prior Publication Data

US 2012/0005908 A1    Jan. 12, 2012

Related U.S. Application Data

(63) Continuation of application No. 12/418,792, filed on Apr. 6, 2009, now Pat. No. 8,061,054, which is a continuation-in-part of application No. 12/123,977, filed on May 20, 2008.

(51) Int. Cl.
  *G01B 3/10* (2006.01)
  *G01B 3/02* (2006.01)
(52) U.S. Cl. ............... 33/668; 33/613; 33/770
(58) Field of Classification Search .......... 33/668, 33/613, 770, 451, 27.03, 27.031, 27.032, 33/485, 491, 759, 760, 758, 768, 810, 811, 33/666, 669, 670
  See application file for complete search history.

(56) References Cited

U.S. PATENT DOCUMENTS

| | | | |
|---|---|---|---|
| 1,653,016 A | | 12/1927 | Mellor |
| 1,988,095 A | * | 1/1935 | Stockman ............... 33/27.03 |
| 3,393,454 A | * | 7/1968 | Creighton ............... 33/27.03 |
| 3,495,334 A | * | 2/1970 | Yamamoto ............... 33/27.03 |
| 3,752,566 A | | 8/1973 | Mathews |
| 4,070,764 A | | 1/1978 | Rohlinger |
| 4,100,681 A | | 7/1978 | Hollander |
| 4,241,510 A | | 12/1980 | Radecki |
| 4,326,339 A | | 4/1982 | Marino |
| 4,507,869 A | * | 4/1985 | Stude ....................... 33/42 |
| 4,547,973 A | * | 10/1985 | Owens ................... 33/27.03 |
| 4,648,185 A | | 3/1987 | Brandimarte |
| 5,103,573 A | | 4/1992 | Ehling et al. |
| 5,560,116 A | | 10/1996 | Tobia |
| 6,029,362 A | | 2/2000 | Miodragovic |
| 6,199,288 B1 | | 3/2001 | Gregory |
| 6,357,716 B1 | | 3/2002 | Kratish et al. |
| 6,421,928 B1 | | 7/2002 | Miller |
| 6,430,827 B2 | | 8/2002 | Ruther |
| 6,473,983 B1 | | 11/2002 | Gier |
| 6,785,977 B1 | | 9/2004 | Crichton |
| 6,996,915 B2 | * | 2/2006 | Ricalde ..................... 33/770 |
| 7,210,243 B2 | | 5/2007 | Schmidt et |
| D565,440 S | | 4/2008 | Neal |
| 7,900,370 B1 | * | 3/2011 | Treige ....................... 33/770 |
| 8,061,054 B2 | * | 11/2011 | Rabin ........................ 33/613 |
| 2001/0013176 A1 | | 8/2001 | Ruther |

(Continued)

OTHER PUBLICATIONS

Black & Decker Power Tools, 36" Accu Mark Gecko Grip Level, Black & Decker Power Tools, one (I) page from website blackanddecker.com, Apr. 28, 2008.

*Primary Examiner* — Christopher Fulton

(74) *Attorney, Agent, or Firm* — Orrick, Herrington & Sutcliffe, LLP

(57) ABSTRACT

An adjustable hanging device for hanging frames, shelves, mirrors, etc., comprising a linear element having thereon a pair of spaced sliders, each slider having a point thereon to enable a spot to be marked on a wall, and a level mounted on the linear element for facilitating leveling of the device so that the item to be mounted will be level, the linear element being retractable into a storage case.

5 Claims, 1 Drawing Sheet

U.S. PATENT DOCUMENTS

| | | |
|---|---|---|
| 2002/0078583 A1 | 6/2002 | Richardson |
| 2002/0095812 A1 | 7/2002 | Newman |
| 2002/0189119 A1 | 12/2002 | High |
| 2003/0033722 A1 | 2/2003 | Lanham |
| 2003/0182811 A1* | 10/2003 | Hairapetian ............... 33/27.032 |
| 2006/0174504 A1 | 8/2006 | Szumer et al. |

* cited by examiner

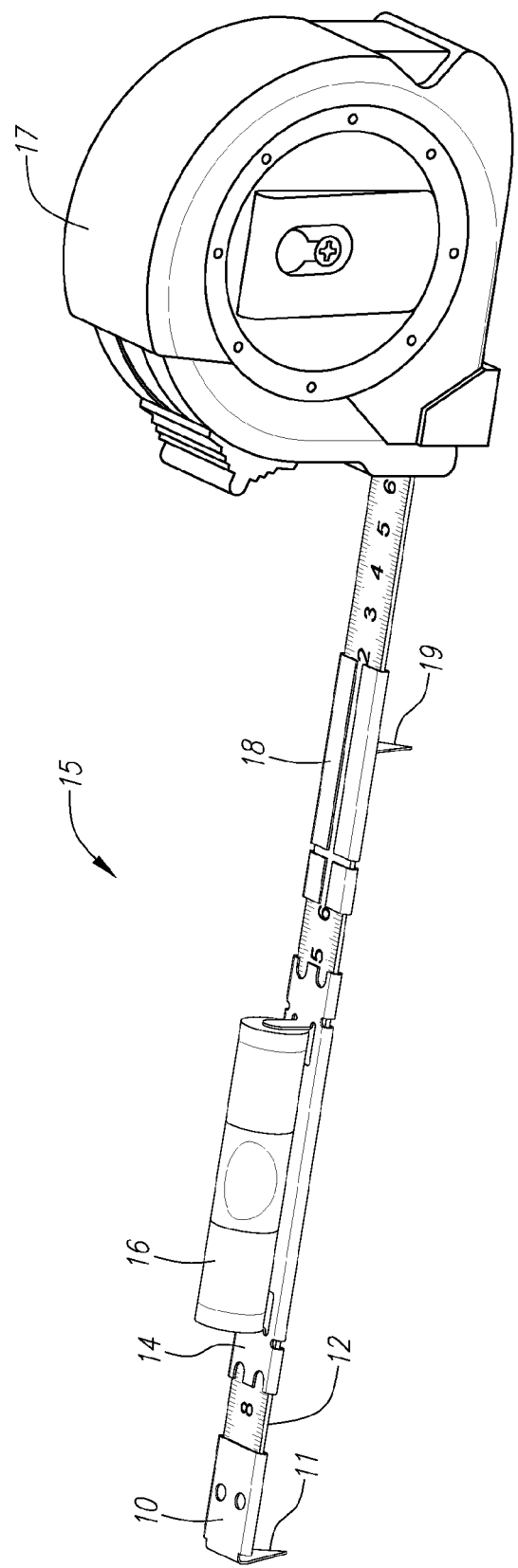

EXPANDABLE LEVELER

CROSS REFERENCE TO RELATED APPLICATIONS

This application is a continuation of U.S. application Ser. No. 12/418,792 filed Apr. 6, 2009, now U.S. Pat. No. 8,061,054 which is a continuation-in-part of U.S. application Ser. No. 12/123,977 filed May 20, 2008, and is incorporated herein by reference.

BACKGROUND OF THE INVENTION

Hanging picture frames and other items on a wall or the like can be simple or complicated. When one hook is used, it is a relatively simple matter to position it accurately so that the picture will hang properly. On the other hand, where two or more spaced hooks are used, there can be difficulty setting the spacing and particularly making sure they are at the same height so that the picture will be level. If one of the two hooks is either higher or lower than the other then it is apparent that the picture will hang at an angle, and multiple attempts will be made to set the spacing correctly.

The purpose of the present invention is to provide a simple device to mark spaced anchor points evenly level. Accordingly, a principle purpose of the present invention is to provide an improved wall hanging aid.

BRIEF DESCRIPTION OF THE DRAWING

These and other features and objects of the invention will become better understood for consideration of the following description wherein FIG. 1 is side view of the wall hanging aid.

DETAILED DESCRIPTION OF THE INVENTION

The present invention relates to an adjustable hanging device to mark hanging anchor points on a wall level. This device can be made of any material not limited to, but including metal, plastic or the like so it can folded or rolled up for storage. Turning first to FIG. 1, the device 15 comprises a linear element 12. In the preferred embodiment, this linear element is a length of common retractable tape measure, allowing the distance between markings to be accurately measured, and enabling concave or convex shape of common measuring tape to reduce the linear element's tendency to bend under its own weight. This measuring tape can rolled up and stored within a spring-loaded storing case 17, allowing it to be extended from and retracted into a more compact form, like a common tape measure. The device has a slider 18 with a point 19 which can be slid to adjust to align one of the anchor hanging points. The device also has a level slider 14 with a built-in level 16 so that the puncture dimples can be leveled without one being higher or lower than the other. The device also has an end slider 10 attached to the tip of the linear element 12 with a point 11, serving to mark the location for another anchor on the wall. In the preferred embodiment, this end slider 10 is permanently attached at the end of the retractable measuring tape, allowing for the maximum amount of tape to be retracted and preventing other sliders from being removed from the end of the tape. However, the end slider can instead be able to be capable of sliding along the length of the tape, like the other sliders 14 and 18 if preferred. Each slider can lock into place by friction so the spacing thereof is not altered before the puncture dimples can be made. Slight pressure is applied to the slider 18 and mounted slider 10 so that the two puncture dimple marks are made into the wall by points 11 and 19.

The first step is to align the slider 18 to a location on the tape so that the points 11 and 19 correspond with the anchor hanging points of the item to be hanged. For the most accurate result, the level slider 14 should be slid to midpoint between points 11 and 19. The second step is to lift the device 15 to the desired location. Third is to level with the built-in level 16 so that the measured adjustable points are level. Fourth is to apply a small amount of pressure to the sliders so that small puncture dimples are made into the wall by the points 11 and 19. The last step is the place the desired anchors into the premeasured and leveled puncture dimple marks.

This device can also be constructed without the level to just measure anchor spacing. The adjustability of this device can be constructed with the sliding pieces or with a series of collapsible pieces that are fit into each other. The device can also be constructed with a piece of cable, rope, or other non-rigid material. This device preferably uses a bubble level, but can also be made with a laser level to ensure the puncture holes are level on the wall. The device has two points 11 and 19 that puncture two holes into the desired surface, but the same device could utilize a marker, chalk, pencil, pen or paint marker to indicate the two places the anchors should be set.

In the preferred embodiment, the storing case 17 is spring-loaded to cause the linear element to automatically retract into the storing case when force ceases to be applied in extending the linear element from the storing case. Other forms of the device may retract using a lever, crank, motor, or other means for retracting the linear element into the storing case. The device can also be built with no external storing case, so long as the linear element can be retracted into a more compact form, either by folding, rolling up, or other equivalents.

Sliders 10, 14, and 18 are preferably made of nylon or plastic, but could be made of aluminum or steel. The points 11 and 19 are preferably steel (and can be the point of a nail).

Unlike the simple use of a level and standard measuring tape, the present hanging aid can give precise locations for the nail, screw, or whatever item is used to hang an item on a wall. The aid simply adjusts to line up with hanging points on the rear of the item to be hanged, and then taken to the wall and pressed against the wall once the aid is leveled. This results in two dimple marks caused by points 11 and 19. As an alternative, the pointers 11 and 19 could be replaced by something to leave a mark such as by way of ink, and such as the end of a ball point pen, chalk, paint marker, or pencil.

Various changes, modifications, variations and other uses and applications of the subject invention will, however, become apparent to those skilled in the art after considering this specification together with the accompanying drawing and claims. All such changes, modifications, variations, and other uses of the application which do not depart from the spirit and scope of the invention are deemed to covered by the invention, which is limited only by the claims which follow.

What is claimed is:

1. A device wherein a linear element is retractable into a compact form to mark hanging anchor points level comprising:
   a linear element,
   one or more sliders mounted on said linear element having points and being adjustable to align to anchor hanging points of item to be hanged, the one or more sliders are fixedly adjusted on the linear element so as to retain the aligned positions, a level disposed on the linear element to enable adequate leveling of the linear element, and wherein the linear element is retractable into a storing case.

2. A device to mark hanging anchor points level comprising:

a linear element, sliders mounted spaced apart on the linear element, with each slider having points and being adjustable to align to anchor hanging points desired, the sliders being fixedly adjustable on the linear element so as to retain selected positions, and one of said sliders including a level to enable adequate leveling of the device, and a means for retracting said linear element into a more compact form.

3. A device as in claim 2 wherein the linear element comprises a semi-rigid material.

4. A device as in claim 2 wherein the linear element comprises a length of semi-rigid measuring tape.

5. A device as in claim 2 wherein the more compact form is achieved by retracting the linear element into a storing case.

* * * * *